United States Patent [19]

Werder

[11] 3,964,624

[45] June 22, 1976

[54] CONTAINER DUMPING APPARATUS
[75] Inventor: Albert W. Werder, St. Louis, Mo.
[73] Assignee: Alvey Inc., St. Louis, Mo.
[22] Filed: Dec. 18, 1974
[21] Appl. No.: 533,880

[52] U.S. Cl. .............................. 214/314; 214/1 BV
[51] Int. Cl.² ......................................... B65G 65/04
[58] Field of Search .......... 294/64 R, 65; 214/1 BS, 214/1 BT, 1 BH, 1 BV, 16.4 A, 312, 313, 314

[56] References Cited
UNITED STATES PATENTS

| | | | |
|---|---|---|---|
| 2,941,675 | 6/1960 | Noble et al. | 294/65 |
| 3,119,139 | 1/1964 | Beard | 214/314 |
| 3,182,823 | 5/1965 | Chasar | 214/16.4 A |
| 3,257,017 | 6/1966 | Ridder | 214/314 |
| 3,351,219 | 11/1967 | Ruderfer | 214/16.4 A |
| 3,462,917 | 8/1969 | Nakashima | 294/64 R |

Primary Examiner—Frank E. Werner
Assistant Examiner—Lawrence J. Oresky
Attorney, Agent, or Firm—Gravely, Lieder & Woodruff

[57] ABSTRACT

A container dumping apparatus for a conveyor system handling a large number of containers having pre-loaded articles or material which need to be transported to a station for unloading, and in which the container is securely grasped and tilted for dumping the articles or material out at the side of the conveyor and is returned to the conveyor where it continues on to clear the apparatus for the next container. The container dumping mechanism may be located at one or more stations, and each mechanism, while being the same at each station, includes suction cups which accommodate a range of variations in sizes of containers and differing conditions of the surface of same.

4 Claims, 6 Drawing Figures

CONTAINER DUMPING APPARATUS

SUMMARY OF THE INVENTION

This invention relates to container dumping apparatus and is particularly related to the dumping apparatus as a part of a conveyor system.

The conveyance of articles or material often requires that the same be moved in tote pans or open containers so that the containers can be dumped, thereby avoiding manual handling to remove the contents. In many installations the articles are piled in the containers and often project out of or overhang the edges so that a confining frame to engage the open rim of a container is prohibited. In other installations the containers are manually lifted from the conveyor for dumping and replaced, but the replacement is not always uniform so that the empty containers assume haphazard alignment which is not desirable.

The apparatus of the present invention is useful in a conveyor system to overcome the problems of handling of large quantities of loose articles, as noted above, and to accelerate the handling of articles in large volumes. The apparatus is arranged to convey containers in a uniform orientation, bring them into predetermined stations, securely grasp and tilt the containers into the dumping position, and return them to the conveyor still in the uniform original orientation for further service in a conveyor system.

The objects of this invention are to provide a simple and reliable container dumping apparatus, to arrange the components of the dumping apparatus for cooperation with a conveyor system to increase the utility of such a system, to make the handling of containers efficient and uniform, and to overcome the problems of mass handling of loose articles or material.

A presently preferred embodiment for cooperation with a conveyor system comprises a cradle mounted adjacent the conveyor with arms movable between positions recessed in the bed of the conveyor and positions angularly displaced from the recessed positions, means to stop the containers in positions registered with the recessed arms, means to actuate the stop means and the cradle arms for dumping a container, and means to control the sequence of operations of the foregoing means as well as to control the means which grasps the container during the dumping phase of operation of the apparatus.

BRIEF DESCRIPTION OF THE DRAWINGS

A preferred embodiment of the present invention is shown in the accompanying drawings relating to a conventional roller conveyor and containers which are shown as tote pans, but may be other types of containers, and wherein.

DETAILED DESCRIPTION OF THE EMBODIMENTS

The dumping apparatus is incorporated in a conventional powered roller conveyor system which propels tote pans from a loading zone to a dump station where it is stopped, securely grasped, rotated or lifted into a dump position and when empty returned to the conveyor and released for further conveyance back to the loading zone for further service. Generally the tote pan will move to the dump station where a suitable device, such as an electric eye, will signal the acutation of a stop to halt further travel of the tote pan and locate the latter in proper position to be grasped by vacuum elements for the dumping operation and replacement on the conveyor.

Figure 1:
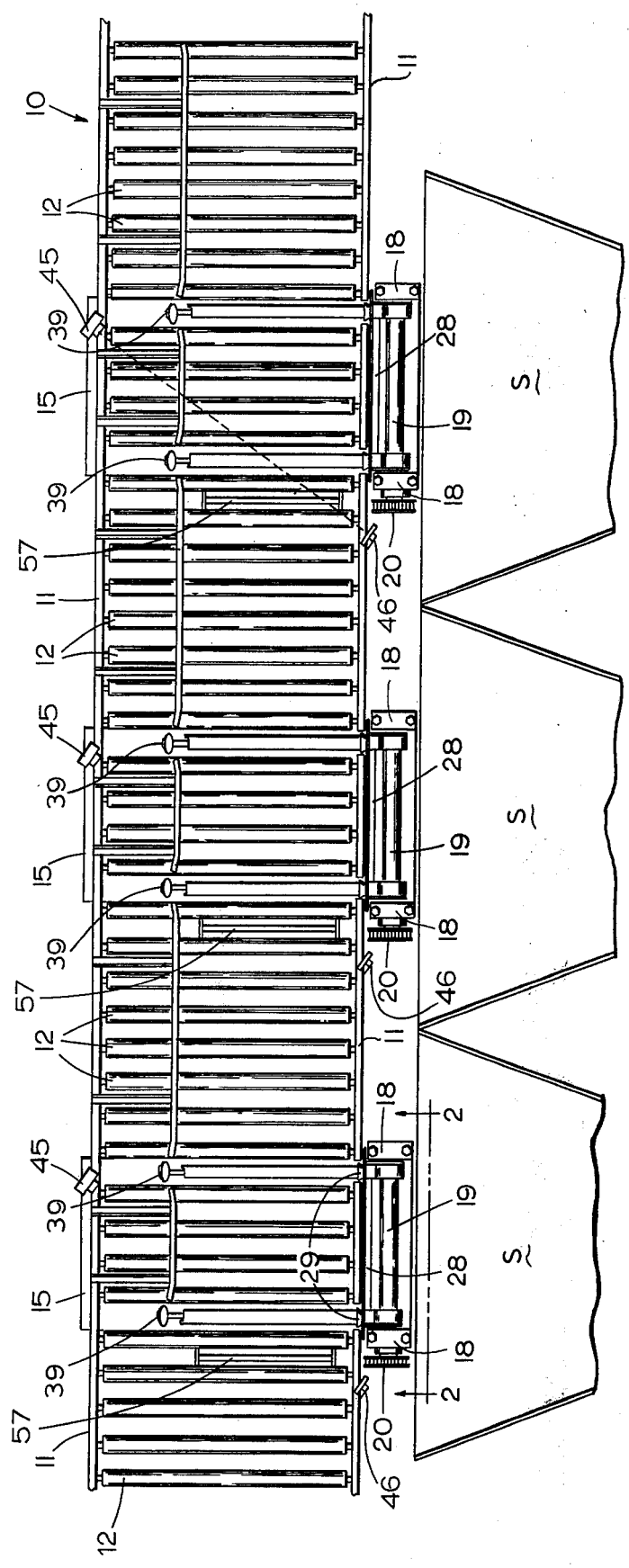
FIG. 1 is a fragmentary plan view of a conveyor system equipped with the apparatus for engaging and dumping tote pans.

The general arrangement of apparatus is seen in plan in FIG. 1 where a conventional roller conveyor 10 is seen to include side rails 11 to support a plurality of rollers 12 powered by being in driving contact with a belt 13 driven in a conventional manner (FIG. 3) which is not believed necessary to show. The conveyor 10 extends along a tote pan dumping station, and in this view there are such stations S represented by chutes or slanted surfaces which catch and direct the articles to a lower position for further handling. Each tote pan dump apparatus is essentially the same so it will be necessary to describe only one, it being understood that the description applies to each or as many as may be needed.

Figure 2:
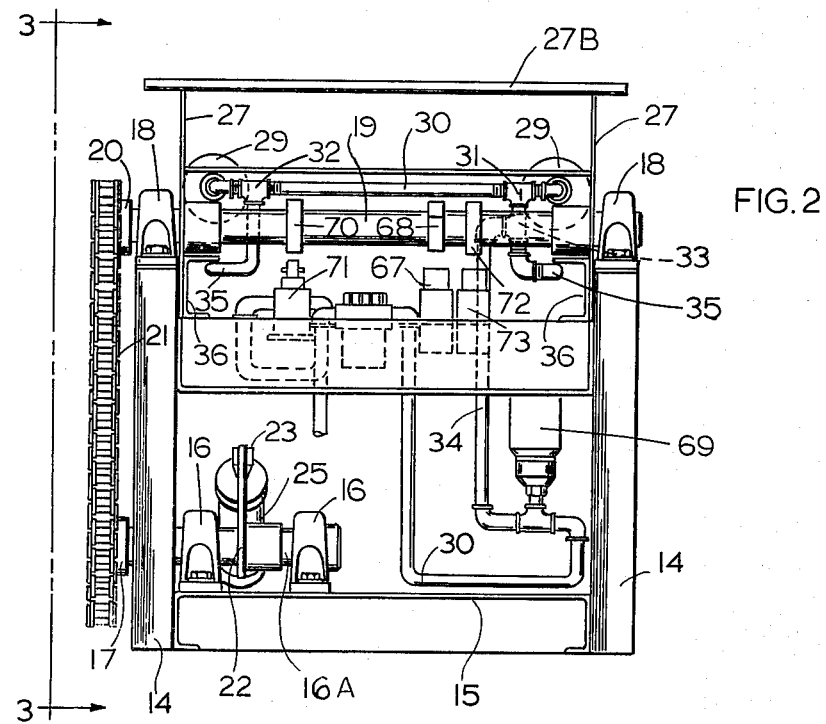
FIG. 2 is an elevation view of a typical assembly of a tote pan dump apparatus taken at line 2—2 in FIG. 1.
Figure 3:
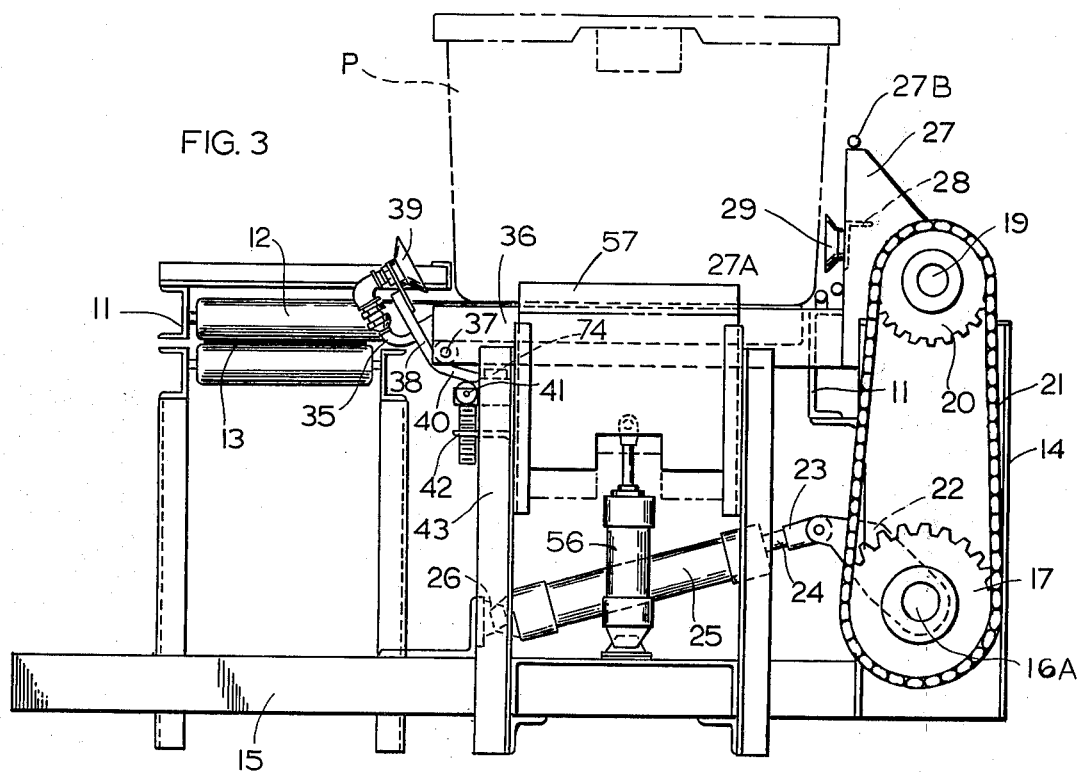
FIG. 3 is a transverse elevation of the tote pan dump apparatus taken along line 3—3 in FIG. 2.

The tote pan dump apparatus is integrated with the conveyor 10 as can be seen in FIGS. 2 and 3. There are a pair of spaced column 14 at the sides of a platform 15. The platform 15 carries suitable bearings 16 for an actuator shaft 16A having one end extending through the adjacent column 14 to carry a drive sprocket 17. The upper ends of columns 14 carry pivot bearings 18 for a torque shaft 19, one end of which carries a sprocket 20 which is driven by a chain 21 from the drive sprocket 17. Suitable slack take up means for the chain may be used but none has been shown for simplifying the drawings. The actuator shaft 16A may be oscillated as required by suitable motor means, and the one shown here is an actuating arm 22 with its outer end connected to the end 23 of a piston rod 24. The cylinder 25 for the piston rod is pivoted from a fixed bracket 26 on the platform 15. The cylinder drives the arm 22 through an arc of about 90° in an oscillatory motion later to be referred to.

The drive for the shaft 19 is through the sprockets 17 and 20 which step up the motion such that the shaft 19 oscillates through an arc of about 135°. The shaft 19 carries near the bearings 18 arms 27 which project above the shaft 19 to support an angle bar 28 (FIG. 3) on which are mounted a pair of vacuum cups 29 facing into the conveyor. Suitable vacuum piping 30 is connected to the cups 29, and T fittings 31 and 32 are included in the piping. The fitting 31 is connected to another T fitting 33 so that the principal pipe 34 and a branch pipe 35 can be connected into pipe 30. The T fitting 32 is provided to accommodate a similar branch pipe 35.

The vertically directed arms 27 on shaft 19 extend below the shaft and each carries a channel shaped normally horizontally directed arm 36 in a position to extend into the conveyor between rollers 12 a distance greater than the width of a tote pan P. The outer end of each arm 36 is provided with a pivot 37 for an arm 38 on which a vacuum cup 39 is mounted. The arm 38 has a control finger 40 which rides an adjustable roller 41 carried by a bracket 42 fixed on a frame 43. Each vacuum cup 39 is connected to the outer end of the previously described branch pipe 35 which extend along the arm 36. As long as each of the arms 36 is positioned between the conveyor rollers 12, the finger 40 will hold the arm 38 in an outwardly divergent position (FIG. 3). When the arms 36 are pivoted upwardly, each arm 38 will be pivoted (FIG. 4) to a more erect position by a tension spring 44. However, the arms 38 will be stopped in the pivoting action when the vacuum cups 39 engage the surface of a tote pan, and this contact usually occurs before the control arms 40 can pass a position where they will not again engage the rollers 41 as the arms 36 return to the starting positions between conveyor rollers 12.

As is shown in FIG. 1, each location of a tote pan dumping apparatus is provided with detection means for recognizing the presence of a tote pan and actuating a stop gate. The detection means comprises a suitable housing 45 for a light source and for a photocell, and spaced across the conveyor is a reflective target 46 which returns the light beam back to the photocell in the housing 45. The photocell is in the circuit shown in FIG. 6 with the solenoid coil 47A in valve unit 47 inserted in the pressure fluid lines 48 and 49 which are connected to supply and return fluid lines 50 and 51 respectively at fittings 52 and 53, thus making line 48 a supply line and line 49 a return line. The solenoid valve 47 selectively delivers pressure fluid to lines 54 and 55 connected into opposite ends of an actuating cylinder 56 for raising and lowering a stop gate 57. The valve 47 is actuated when the light beam received at photocell in the housing 45 is interrupted by the appropriate tote pan P. Upon actuation of valve 47, pressure fluid from the supply lines 50 and 48 will be admitted through line 55 to the lower end of cylinder 56 to raise the gate 57. The displaced fluid from cylinder 56 will be forced out through line 54, valve 47 and lines 49 and 51. Of course, the reverse flow pattern is necessary to drop the gate 57 when the tote pan is ready to move on down the conveyor, as the rollers 12 are constantly driven by belt 13.

Figure 5:
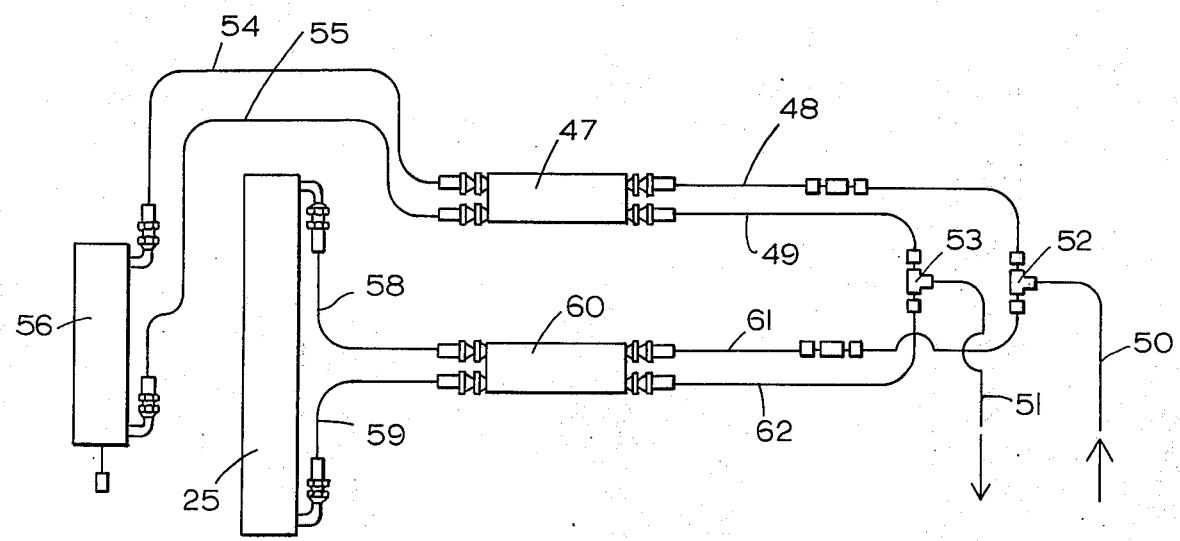
FIG. 5 is a schematic view of a fluid pressure system for certain of the operating components of the apparatus seen in FIG. 3.

The view of FIG. 5 shows that the actuation cylinder 25 for the dumping arms 36 is connected by pressure fluid lines 58 and 59 to a spring return solenoid control valve 60, and that valve is connected by lines 61 and 62 with the supply and return lines 52 and 51 at the respective fittings 52 and 53.

Figure 6:
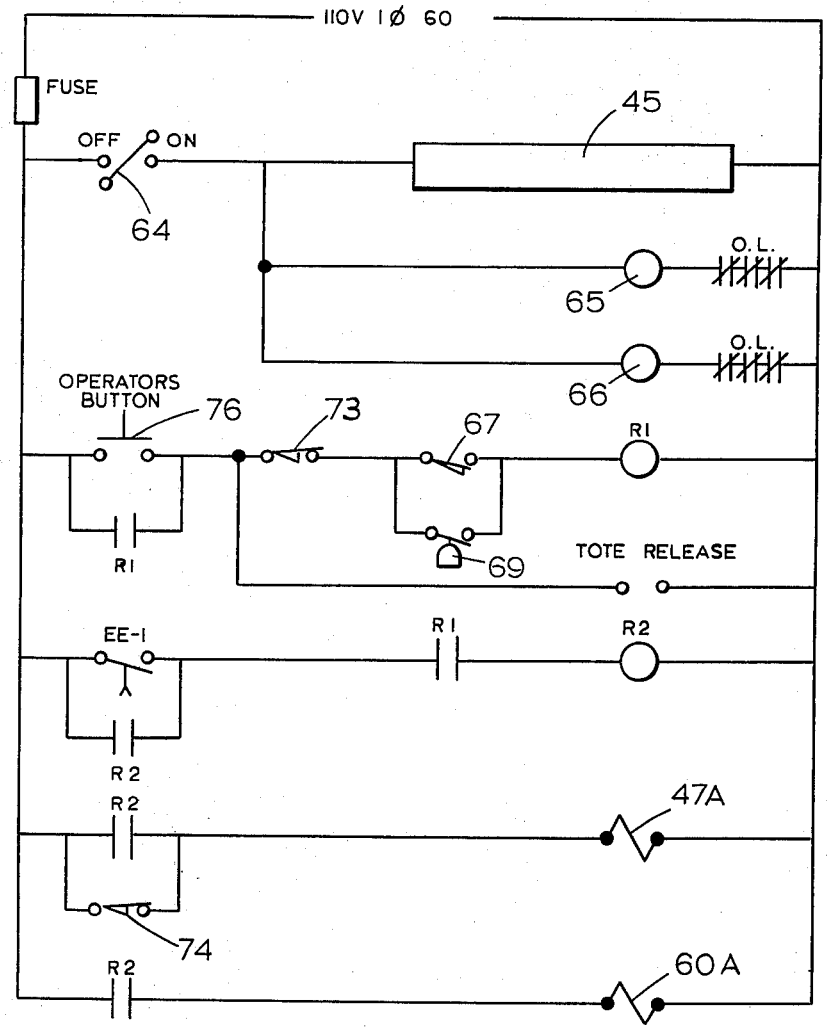
FIG. 6 is a diagram of a simple control circuit for rendering the sequence of operations generally automatic in character.

Now turning to FIG. 6, the simplified wiring diagram will be described in some detail, with reference to other views of the drawings as may be needed. The photocell in housing 45 is turned on by closing the start-stop switch 64, and this action starts the motors 65 and 66 for actuating the pressure fluid pump as well as the vacuum pump. The drive for the conveyor roller actuating belt 13 is started by other means not shown so the rollers 12 will move any tote pan P engaged therewith.

Figure 4:
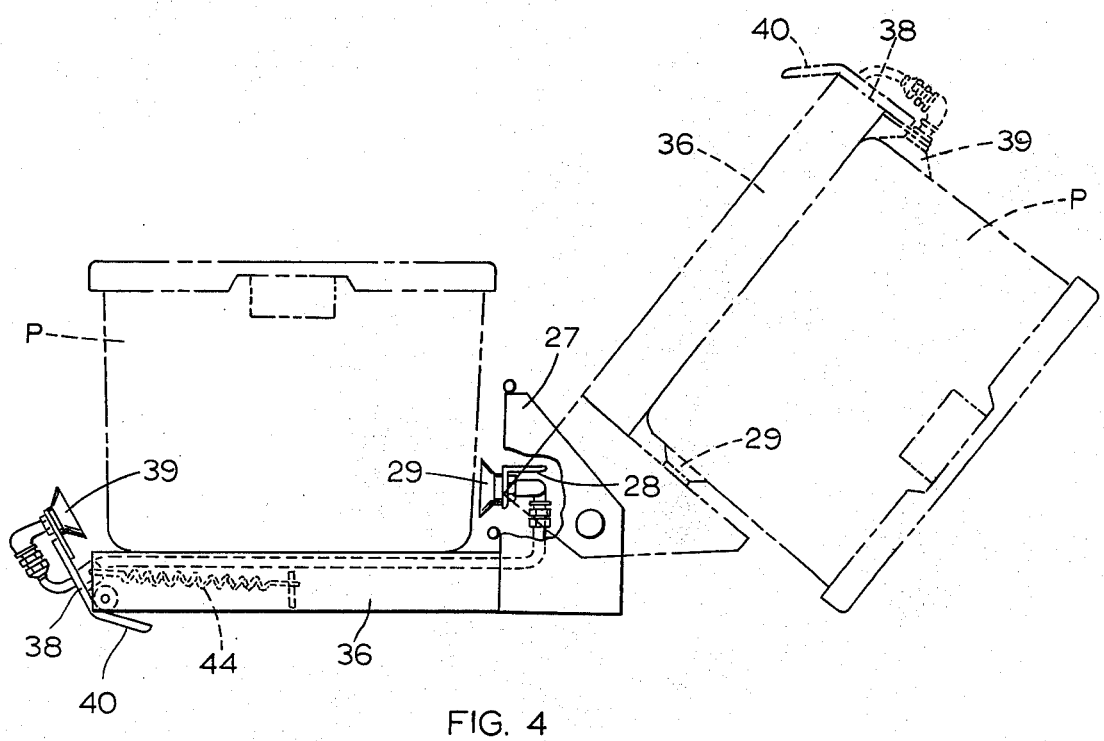
FIG. 4 is a fragmentary view similar to FIG. 3, but showing apparatus in the dump position.

The tote pan P is held in position throughout the dumping operation by means of vacuum cups 29 and 39 positioned against the exterior of the tote pan P near the bottom (See FIG. 4).

The actual dumping movement is effected by means of the hydraulic cylinder 25 acting through a roller chain drive 21. The cylinder is in turn controlled by a single solenoid spring return 4 way valve 60. This is normally in a de-energized condition and the cylinder is retracted to the position in FIG. 3. A limit switch, such as a magnetic proximity sensing switch 67 has normally open contacts which are held closed by means of magnetic material on the adjacent cam 68, while the arms 36 are in the home position. Vacuum switch 69 is parallel wired with sensing switch 67 and contacts for switch 69 are wired in a normally open condition also. Sensing switch 67 and vacuum switch 69 are both wired in the control circuit of the solenoid coil 60A in valve 60.

When the photocell light beam of the detection means is broken a signal is sent through the closed sensing switch 67 and energizes the coil 60A in solenoid valve 60. This causes cylinder 25 to extend and the dump arms 36 to rise. As the dump arms rise the drive 21 will rotate shaft 19 and this will cause cam 70 (FIG. 2) to depress a vacuum line control valve 71 opening the suction cups 29 and 39 and vacuum switch 69 to the piping 30. As the dump arms 36 rotate to a point about 10° or 15° above the horizontal position (FIG. 3) spring activated levers 38 will be released from the retracting rollers 41 allowing the outer pair of cups 39 to contact the off side of the tote pan P. If at this initial angular rise, the seal at all of the cups 29 and 39 is tight, then the ensuing vacuum will establish the grip and close the contacts in vacuum switch 69.

The dump arms 36 will continue to swing upward and the shaft 19 will rotate cam 68 where it no longer will hold contacts closed in sensing switch 67. At this time, if the contacts in vacuum switch 69 have not closed because a tote pan holding vacuum has not been achieved by the cups 29 and 39, then the circuit to solenoid valve 60 will open and the result is that cylinder 25 will retract the arms 36 to the home position and shut the system off. This is a safety check to determine if the tote pan P will be securely held during the entire dump operation.

If a working vacuum has been obtained, the dumping action can continue. The dump arms 36 will continue to rotate until a position of about 135° above home position has been attained (See FIG. 4). At this point cam 72 on shaft 19 will cause the magnetic contacts in sensing switch 73 to open which will in turn open the circuit to solenoid valve 60 causing cylinder 25 to retract returning the dump arm 36 to the home position. When home position has been reached magnetic material fixed to the dump mechanism will cause magnetic contacts in sensing switch 74 (FIG. 3) to open the stop control circuit causing the stop 57 to retract allowing the empty tote pan P to be conveyed out of the area and the dump mechanism made available for another operation.

In the foregoing operation, each time a tote pan P is to be dumped, the attendent at control switch 76 will select the station and actuate the switch in time to have the coil 47A operate the solenoid valve 47 to supply the pressure fluid to the cylinder 56 (FIG. 5) to elevate the stop gate 57 at that station. The various functions of the operating components will then automatically proceed in the order described and if the required vacuum at the vacuum switch 69 is present the dump will proceed to completion. It will be convenient to refer to the arms 36 and the vacuum cups 29 and 39 as a cradle to pick up the tote pan P at which ever station has been selected and swing it, as in FIG. 4, between the home position with the arms 36 horizontally within the conveyor rollers 12 and the dump position where the arms 36 are elevated. As the arms 36 swing into the tilted dump position the tote pan will shift its weight against the vertical arms 27 and these arms are strengthened by being tied together by horizontal rods 27A and 27B (FIG. 3) so that heavy articles which press on the low side of the tote pan will be restrained by these rods.

It should now be clear in what manner the present apparatus overcomes the problems in this field and operates in a relatively simple manner to carry out the objectives herein set forth.

What is claimed is:

1. In container dumping apparatus, the combination comprising: a conveyor having a series of spaced rollers forming a continuous path for the travel of open top tote pans; roller drive means in said conveyor in driving engagement with said rollers at one side of the path of pan travel; a frame in said conveyor defining a pan dump station, said frame having a column disposed at the opposite side of the path of pan travel from said roller drive means; a shaft supported in said column with its axis parallel to the path of pan travel; reversible motor means operably connected to said shaft to oscillate said shaft between raised dump position and lowered home position; tote pan dump means having a pair of arms carried by said shaft in spaced apart relation with pan lift portions which in the shaft home position normally extend toward said roller drive means and are recessed between said conveyor rollers to be below the pans, and support arm portions carried on an extending outwardly at right angles to said pan lift portions and disposed adjacent said opposite side of said path of pan travel adjacent said shaft; first pan engaging vacuum means carried by each of said support arm portions in fixed positions; second pan engaging vacuum means operably mounted on each of said pan lift arms portions to move between retracted positions and pan engaging positions; resilient means connected to said second vacuum means urging them toward pan engaging positions; position control means connected to said second vacuum means and to said frame and operable to oppose said resilient means and move said second vacuum means to retracted positons; vacuum lines connected to said first and second pan engaging vacuum means to develop a suction grip upon a tote pan by and between said first and second vacuum means; and control means in said vacuum lines responsive to oscillation of said shaft in a direction to raise the pan lift arm portions out of the normally lowered home position recessed between said conveyor rollers to establish a vacuum at each of said first and second vacuum means, said raising of said pan lift arm portions causing the pan to shift against said first pan engaging vacuum means and causing said position control means to yield to said resilient means and allow said second pan engaging vacuum means to move into pan engagement.

2. The apparatus set forth in claim 1 wherein said frame in said conveyor carries means in position to be engaged by said position control means connected to said second vacuum means to hold said second vacuum means in retracted positions, said second vacuum means being positioned on said pan lift arms such that on operation of said shaft out of the home position said resilient means urges said second vacuum means into pan engaging positions in opposition to said first pan engaging vacuum means, thereby gripping the pan between said first and second vacuum means.

3. The apparatus set forth in claim 1 wherein said position control means are levers pivoted to said pan lift portions of said arms, and means is fixed to said frame in position to be engaged by and pivot said levers on the lift portion of said arms in a direction to retract said second vacuum means upon said lift portion of said arms approaching the lowered home position.

4. The apparatus set forth in claim 1 wherein said control means includes first control means to test the engagement of said gripping means with the container, said first control means being effective to reverse said motor means and return said arms to the lowered home position upon failure of said first and second vacuum means to secure a vacuum engagement with the pan.

* * * * *